US005142972A

United States Patent [19]

Sundquist

[11] Patent Number: 5,142,972

[45] Date of Patent: Sep. 1, 1992

[54] FEEDING DEVICE FOR VEGETABLE CUTTING MACHINES

[75] Inventor: Jarl Sundquist, Sollentuna, Sweden

[73] Assignee: AB Hällde Maskiner, Kista, Sweden

[21] Appl. No.: 678,734

[22] Filed: Apr. 1, 1991

[30] Foreign Application Priority Data

Apr. 4, 1990 [SE] Sweden ............................ 9001239

[51] Int. Cl.[5] ............................ A23N 3/00

[52] U.S. Cl. ............................ 99/537; 99/538; 99/584; 99/588; 99/510; 241/64; 241/101.1

[58] Field of Search .......... 99/537, 538, 541, 542-545, 99/547, 565; 83/114, 161, 167, 437, 588; 241/63, 101.1, 64, 101.2; 100/226

[56] References Cited

U.S. PATENT DOCUMENTS

| | | | |
|---|---|---|---|
| 419,722 | 1/1890 | Siersdorfer | 99/545 |
| 539,664 | 5/1895 | Bullard | 99/565 |
| 943,193 | 12/1909 | Irwin | 99/565 |
| 2,373,781 | 4/1945 | Richardson | 100/226 |
| 2,852,053 | 9/1958 | Berry et al. | 83/437 |
| 3,150,701 | 9/1964 | Zimmerman | 83/588 |
| 3,468,355 | 9/1969 | Hall | 99/537 |
| 4,426,924 | 1/1984 | Calwell | 99/545 |
| 4,441,413 | 4/1984 | Mori | 99/544 |
| 4,653,393 | 3/1987 | Ross | 99/542 |
| 5,067,397 | 11/1991 | Healy | 99/542 |

FOREIGN PATENT DOCUMENTS

| | | | |
|---|---|---|---|
| 817351 | 8/1951 | Fed. Rep. of Germany | 99/545 |

*Primary Examiner*—Timothy F. Simone
*Attorney, Agent, or Firm*—Nies, Kurz, Bergert & Tamburro

[57] ABSTRACT

An improvement in vegetable cutting machines of the kind comprising a cylindrical feeder (1) which includes a vertically upstanding cylinderical tube (2) and a vegetable press-feed device (3) in the form of a plate (4) which extends perpendicular to the longitudinal axis of the tube and which is linearly movable relative to the tube, wherein the plate is carried by a stand arm unit placed parallel with the tube and including an upper stand arm (6) having a downwardly projecting shaft (7), wherein the shaft coacts with a tubular part (8) on a lower stand arm (9), thereby enabling the plate (4) to be swung away from the top orifice of the tube (2) and enable vegetables to be inserted into the tube for disintegration in the machine, and wherein a cutting tool comprising a disc provided with one or more knives is mounted in the vicinity of the bottom orifice of the tube (2). The improvements characterized in that the wall of the lower arm (9) is perforated with an L-shaped slot (12) having a part which extends parallel to the longitudinal axis of the stand arm-unit and which terminated at the upper end (13) of the lower arm; in that the shaft (7) of the upper arm (6) is provided with an outwardly projecting peg (14) intended for coaction with the slot; in that the upper arm (6) is provided with an outwardly projecting wing (15) or the like which functions to restrict rotational movement of the upper arm to a first position through coaction with a stop (16); in that the stop can be moved against the action of a spring force such as to enable the upper arm to be rotated to a second position past the first position, in which second position the peg (14) is positioned so as to be able to run in that part of the L-shaped slot (12) which extends parallel with the longitudinal axis of the stand arm-unit.

2 Claims, 3 Drawing Sheets

FEEDING DEVICE FOR VEGETABLE CUTTING MACHINES

The present invention pertains to an improvement in and relating to vegetable cutting machines.

BACKGROUND OF THE INVENTION

Vegetable cutting machines are used in large kitchens and restaurants to disintegrate green vegetables and root vegetables, hereinafter referred to collectively as vegetables.

One such machine is described in U.S. Pat. No. 3,468,355 to E.O.S. Hall, entitled DEVICE IN MACHINES FOR CUTTING FOODSTUFF. This known machine comprises a cylindrical feeding unit which includes a vertically upright cylindrical tube and a vegetable press-feed device in the form of a plate which extends perpendicular to the longitudinal axis of the tube. The plate can be moved linearly in the tube, either manually or mechanically with the aid of drive means. The plate can be swung away from the top orifice of the tube, so as to enable vegetables or vegetables to be inserted into the tube for disintegration in the machine. A cutting tool including a rotatable cutting disc with one or more knives is mounted adjacent the bottom orifice of the tube. When the disc rotates and a vegetable in the vegetable feeding unit is pressed down against the cutting tool by means of said press-feed device, the vegetable is disintegrated and the vegetable cuttings exit from the machine through apertures provided in the cutting tool, in the vicinity of the knives.

It is necessary to remove the cylindrical feeding unit in order to clean the knife-housing of the machine. Such cylindrical feeders, however, are relatively large and therewith relatively heavy. Because of its size and shape, the cylindrical feeder is also cumbersome to handle. It is also necessary to clean the feeder regularly, which is a troublesome task, due to the configuration of the feeder.

In the case of one known machine, the cylindrical tube and the vegetable press-feed device are fitted together so as always to form a unit. This cylindrical feeder, however, is heavy and awkward to handle and to clean, as before mentioned. In the case of another known machine, the vegetable press-feed device can be lifted easily from the cylindrical tube. This design, however, is very liable to result in accidents, since the personnel concerned often lift-out the entire cylindrical feeder unit and then separate the unit into two parts, namely the tube and the vegetable press-feed device, the danger here being that the tube will fall onto the feet of the person concerned. Since the tube is relatively heavy, this can result in serious injury. Consequently, it is necessary to be able to handle the cylindrical feeder as an integral unit which cannot be separated into its component parts unintentionally when removing the feeder temporarily and when carrying the feeder from one place to another.

SUMMARY OF THE INVENTION

The afore-mentioned problems are solved by means of the present invention, which provides an arrangement for preventing unintentional separation of the two component parts of the cylindrical feeder.

The present invention relates to an improvement in vegetable cutting machines of the kind comprising a cylindrical feeder or hopper which includes a vertically upstanding cylindrical tube and a vegetable press-feed device in the form of a plate which extends perpendicularly to the longitudinal axis of the tube and which is linearly movable in relation to said tube, wherein the plate is carried by a stand arm-unit which is placed parallel with the tube and which includes an upper arm having a downwardly extending shaft which coacts with a tubular part of a lower arm of said arm unit, and wherein the plate can be swung away from the top orifice of the tube to allow vegetables to be inserted into the tube for disintegration in the machine, wherein a cutting tool which includes a cutting disc provided with one or more knives is mounted adjacent the bottom orifice of the tube, the improvement being seen in the provision of an L-shaped slot in the wall of the lower stand arm, said slot having a part which extends along the upper end of the lower stand arm parallel with the longitudinal axis of said arm; in the provision of an outwardly projecting peg on the shaft of the upper stand arm, said peg being intended to coact with said slot; in the provision on said upper stand arm of an outwardly projecting wing or the like which functions to limit pivotal or rotational movement of the upper stand arm to a first position through coaction with a stop lock; in mounting the stop lock for movement against a spring force such as to enable the upper stand arm to be rotated to a second position past said first position, in which second position the peg is located for movement in the part of the L-shaped slot that extends parallel with the longitudinal axis of the stand arm.

BRIEF DESCRIPTION OF THE DRAWING

The invention will now be described in more detail with reference to exemplifying embodiment thereof illustrated in the accompanying drawings, in which.

DESCRIPTION OF THE PREFERRED EMBODIMENT

Figure 1:
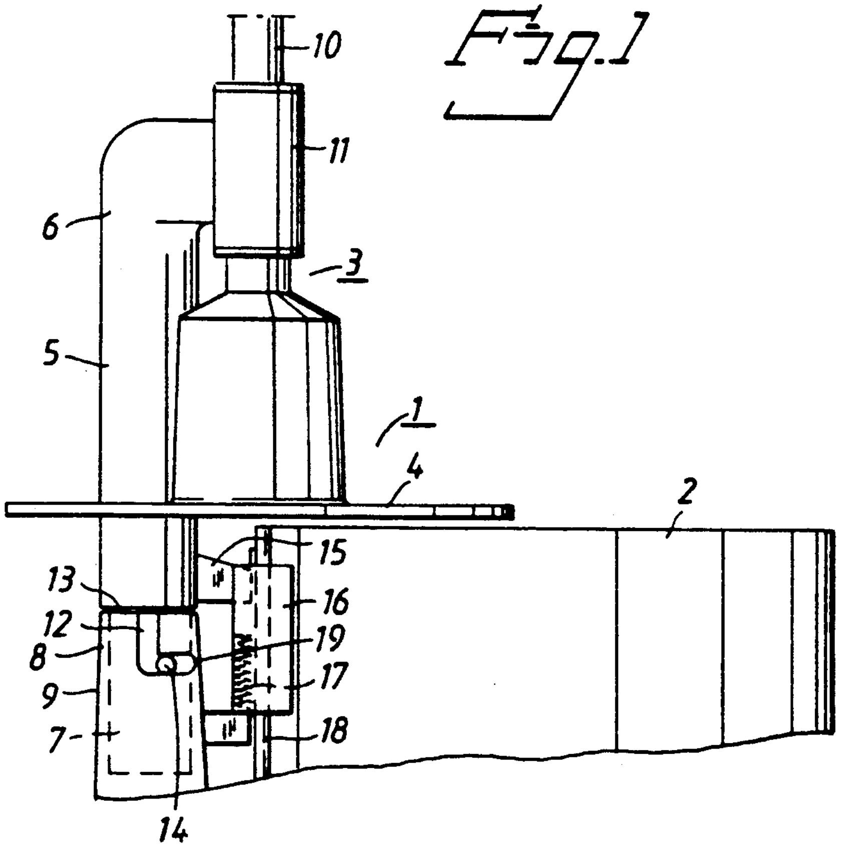
FIG. 1 illustrates part of a cylindrical feeder in a locked state.
Figure 2:
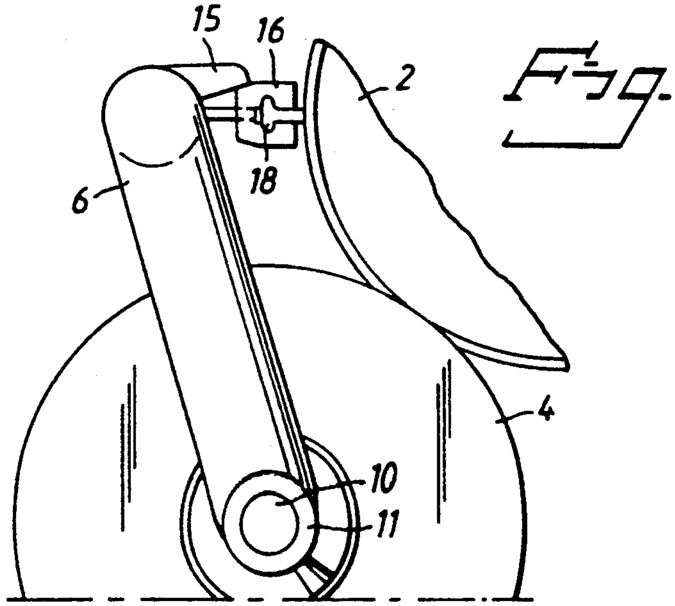
FIG. 2 is a top view of the feeder shown in FIG. 1.

FIGS. 1 and 2 illustrate a vegetable cutting machine in which the invention is applied. The illustrated machine comprises a cylindrical feeder 1 which includes a vertical upstanding cylindrical tube 2 and a vegetable press-feed device 3 in the form of a plate 4 which extends perpendicular to the longitudinal axis of the tube 2 and which can move linearly in relation to the tube. The plate 4 is carried by a stand-arm unit 5 which includes an upper arm part 6 having a downwardly extending shaft 7. The shaft 7 coacts with a tubular sleeve 8 of a lower arm part 9 of the arm-unit, thereby enabling the plate to be swung away from the upper orifice of the tube, so as to enable vegetables to be inserted into the tube for disintegration in the machine. The plate is shown in its extreme outwardly swung position in FIG. 3. The plate can be swung from this illustrated position to a position in which the plate is concentrical with the tube 2. When the plate occupies this, latter position, the plate can be moved linearly within the tube. The plate may either be moved manually or with the aid of a pneumatic pistoncylinder device. The plate is moved by means of a shaft 10 which runs in a sleeve 11 on the upper arm part 6.

Figure 5:
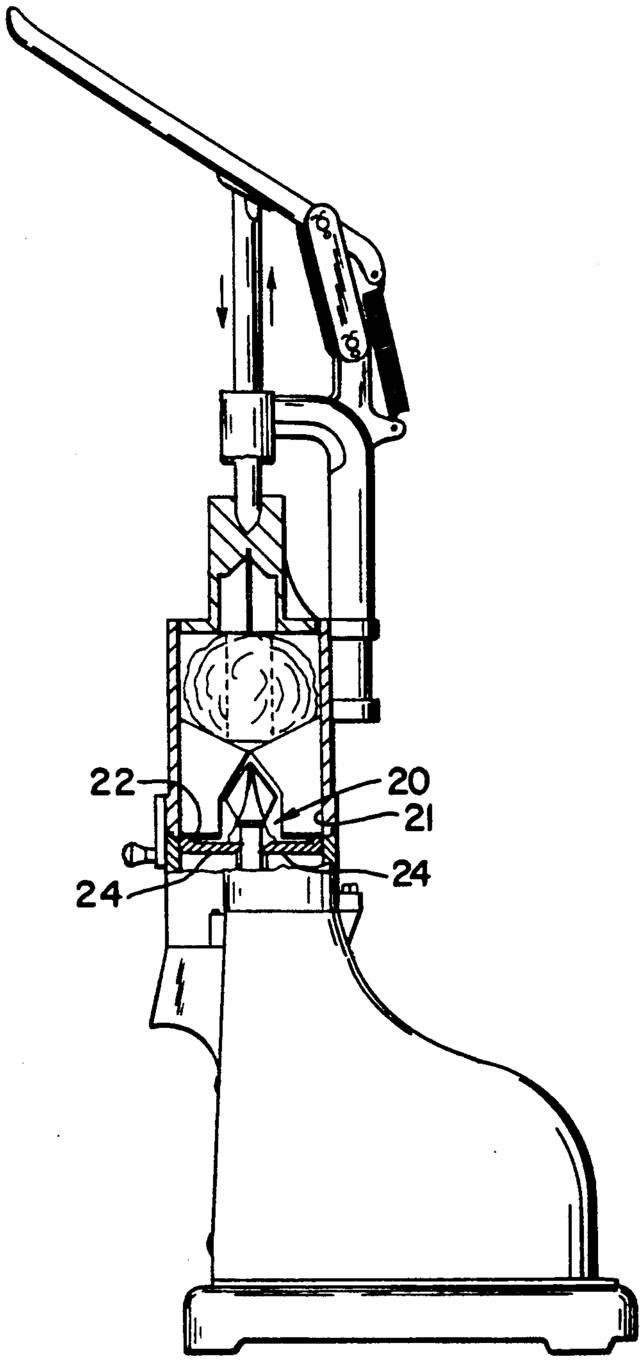
Fig. 5 PRIOR ART
FIG. 5 is a side view of a prior art machine into which the present invention can be incorporated.

Shown in FIG. 5, a machine of this kind, in a known manner, as shown and described in the aforementioned U.S. Pat. No. 3,468,355, is provided adjacent the bottom orifice 21 of the tube 2 with a cutting tool 20 comprising a cutting disc 22 provided with one or more knives 24.

Figure 3:
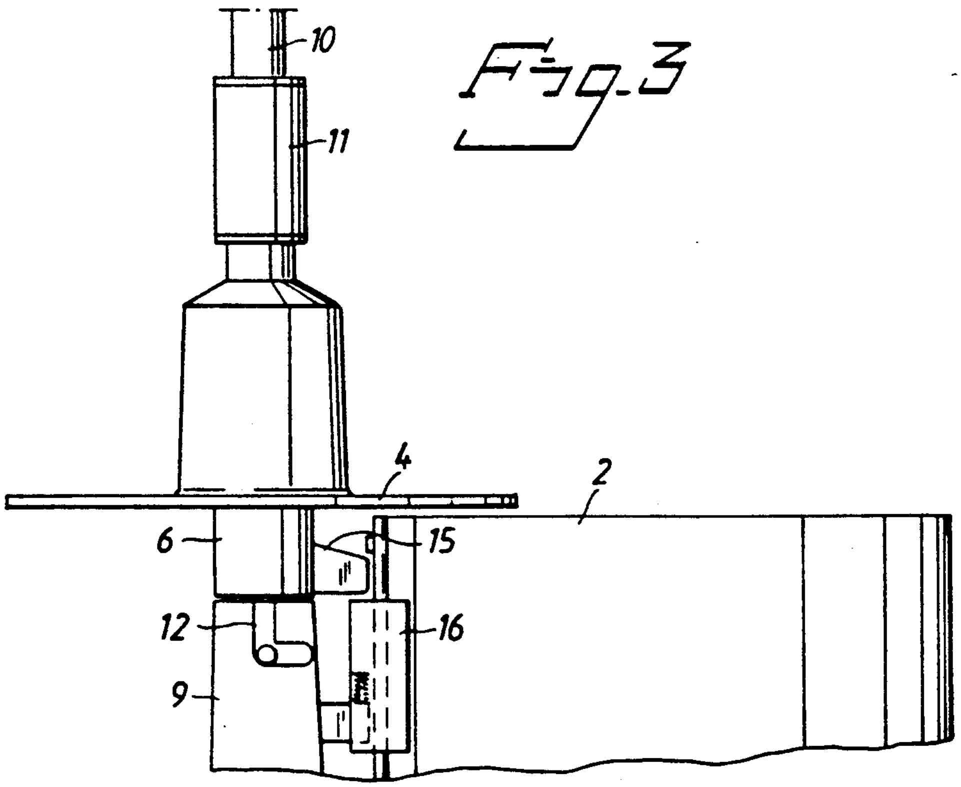
FIG. 3 illustrates part of a cylindrical feeder in an open position.

In accordance with the invention, the sleeve 8 on the bottom arm part 9 of the arm-unit 5 is provided with an L-shaped slot 12 clearly shown in FIGS. 1 and 3, which penetrates the wall of the sleeve. The L-shaped slot 12 has a lower horizontal portion and an upper vertical portion which extends parallel with the longitudinal axis of the stand arm-unit 6, 9 and extends out to the upper edge 13 of the sleeve 8 of the bottom arm part 9. Mounted on the shaft 7 of the top arm part 6 is an outwardly projecting peg 14 which coacts within the slot. The upper arm part 6 is also provided with an outwardly projecting wing 15 which is intended to limit rotary movement of the upper arm part 6 to a first position, by coaction with a stop block 16. This position is shown in FIGS. 1 and 2. The two parts of the cylindrical feeder, namely the tube 2 and the vegetable press-feed device 3 are herewith locked together.

Figure 4:
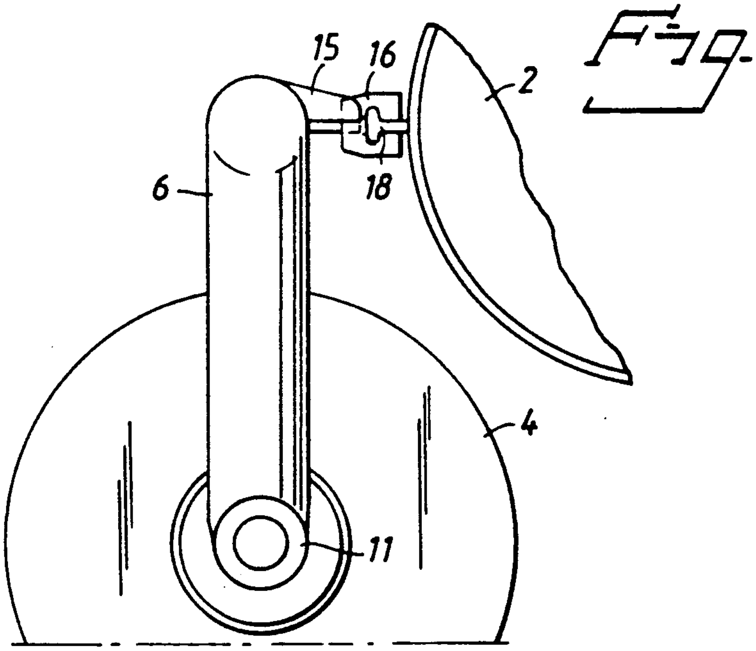
FIG. 4 is a top view of the cylindrical feeder shown in FIG. 3.

The stop block 16 can be moved against the action of a spring, for instance a helical spring 17, so that the wing 15 on the upper arm part is able to pass over the stop block 16, thereby enabling the upper arm 6 to be rotated to a second position past the first mentioned position. In this second position, the peg 14 is located in a position in which it can slide in the upper vertical portion of the L-shaped slot 12 which extends parallel to the longitudinal axis of the stand arm-unit 5. This position is shown in FIGS. 3 and 4. In this position, the vegetable press-feed device 3 can be lifted straight up so that the upper arm part 5 will leave the lower arm part 9.

The L-shaped slot is configured so that, in coaction with the peg 14, the plate 4 will be positioned concentrically with the tube 2 when the upper arm 6 is rotated to an opposite position relative to the position shown in FIG. 3, a position in which the peg 14 lies against the end wall 19 of the lower horizontal portion of the L-shaped slot.

According to one preferred embodiment, the block moves on a profiled track member 18 which projects out from the exterior surface of the cylindrical feeder tube 2.

Thus, the cylindrical tube and the vegetable feeding device 3 can be separated from one another very easily, while, at the same time, when combined in a working position, in which the upper stand arm has limited rotational movement between two positions, it is impossible to separate the vegetable press-feed device from the cylindrical tube by rotating said device.

Although the invention has been described with reference to an exemplifying embodiment thereof, it will be understood that modifications can be made without departing from the intended function thereof.

The invention is therefore not restricted to the aforedescribed embodiments, since modifications can be made within the scope of the following claims.

I claim:

1. An improvement in vegetable cutting machines of the kind comprising a cylindrical feeder (1) which includes a vertically upstanding cylindrical tube (2) with a top end orifice and a bottom end orifice and a vegetable press-feed device (3) comprising a plate (4) which extends perpendicular to the longitudinal axis of the tube and which is linearly movable into and relative to said tube, wherein the vegetable feed device with said plate is carried by a stand-arm unit, including an upper arm part and a lower arm part, placed parallel with the tube, said upper arm part (6) having a downwardly projecting shaft (7), and said lower arm part having a tubular sleeve with encircling wall, wherein said shaft is received in and adapted to pivot in said tubular sleeve (8) thereby enabling the vegetable feed device with plate (4) to be swung away from the top orifice of said tube (2) to enable vegetables to be inserted into said tube for disintegration in said machine, and wherein a cutting tool comprising a rotatable disc provided with at least one knife is mounted adjacent the bottom orifice of the tube (2), said sleeve wall of the lower arm part (9) is penetrated to provide an L-shaped slot (12) with an upper vertical portion which extends parallel to the longitudinal axis of the sleeve and which extends to the upper edge (13) of said sleeve wall; said shaft (7) on the upper arm part (6) being provided with an outwardly projecting peg (14) intended for coaction with and interlocking with said L-shaped slot upon insertion and pivoting in the manner of a bayonet coupling; and said upper arm part (6) being provided with an outwardly projecting wing (15); a vertically shiftable stop block means is provided on the exterior of said tube; said wing functions to restrict pivotal movement of the upper arm part to a first position through coaction and abutment with said stop block means (16); said stop block means including a stop block and a bias spring whereby said stop block can be moved vertically against the action of said biasing spring away from the pivotal path of said wing so as to enable the upper arm part to be rotated to a second position past said first position, in which second position said peg (14) is positioned so as to be movable vertically in that vertical portion of the L-shaped slot (12) which extends parallel with the longitudinal axis of the stand arm-unit.

2. A machine according to claim 1, wherein a profiled vertical track member (18) is mounted to project from the outer surface of the cylindrical tube, and said stop block is fitted on and movable vertically on said profiled track member.

* * * * *